United States Patent [19]

Keller

[11] 4,299,247
[45] Nov. 10, 1981

[54] FUEL TANK VENT

[76] Inventor: Russell D. Keller, 1750 SE. Risley, Milwaukie, Oreg. 97222

[21] Appl. No.: 107,977

[22] Filed: Jan. 3, 1980

Related U.S. Application Data

[63] Continuation-in-part of Ser. No. 2,242, Jan. 10, 1979.

[51] Int. Cl.³ ............................................. F16K 17/36
[52] U.S. Cl. ............................................................ 137/43
[58] Field of Search .............................. 137/38, 39, 43

[56] References Cited

U.S. PATENT DOCUMENTS

| | | | |
|---|---|---|---|
| 2,869,563 | 1/1959 | Schoengrun | 137/43 |
| 3,021,856 | 2/1962 | Bend | 137/43 |
| 3,389,715 | 6/1968 | Hebard | 137/43 |
| 3,994,360 | 11/1976 | Leibold | 137/38 X |
| 4,185,651 | 1/1980 | Paulson | 137/38 |

FOREIGN PATENT DOCUMENTS

| | | | |
|---|---|---|---|
| 1016643 | 1/1955 | Fed. Rep. of Germany | 137/43 |
| 544427 | 6/1922 | France | 137/43 |
| 2352232 | 5/1976 | France | 137/43 |
| 470171 | 8/1937 | United Kingdom | 137/43 |

Primary Examiner—Robert G. Nilson

[57] ABSTRACT

A fuel tank vent apparatus includes an upper housing for enclosing a movable weight in the form of a metal ball. The lower part of the apparatus is provided with venting ports closable by a push rod operated piston, wherein such push rod is spring biased upwardly toward the aforementioned metal ball. For a normal, upright position of the apparatus, the ball is centered in its housing by a ramp and urges the push rod downwardly against spring bias whereby ports into the tank are open allowing venting. However, if the apparatus becomes inclined to a predetermined angle, the ball is supported to a greater extent by the ramp surrounding the push rod, allowing the biasing spring to urge the push rod upwardly for moving the piston and closing the vents. Thus, should a vehicle containing this vent apparatus overturn or otherwise be oriented at greater than a predetermined angle whereby fuel would be apt to escape, the vent will be closed in response to spring bias.

8 Claims, 5 Drawing Figures

FUEL TANK VENT

CROSS REFERENCE TO RELATED APPLICATION

This application is a continuation-in-part of my application Ser. No. 2,242 filed Jan. 10, 1979, and entitled "Fuel Vent with Gravity Valve".

BACKGROUND OF THE INVENTION

The subject matter of the present invention relates generally to fuel vent apparatus for venting gaseous fuel vapors of a fuel tank, and in particular to such a vent apparatus which also includes an improved gravity operated valve to prevent liquid fuel spillage from the tank.

The fuel vent apparatus of the present invention is especially useful on the fuel tanks of trucks and other vehicles operated by liquid fuel such as gasoline, diesel fuel and the like. However, it is also useful on fuel tanks for outboard motor boats, lawn mowers, chain saws, etc., to prevent fuel spillage and fires when such fuel tanks are accidentally overturned.

Previously, it has been proposed to provide a fuel tank with a fuel filler cap having a gravity operated valve which closes a vent passsage in such a cap when the tank overturns. However, prior art gravity valves have been provided with weights positioned below the valve members and close the valve only after tipping the tank through a relatively large angle, or in other instances pressures within the tank have caused valves to "stick" in the closed position without providing proper venting. As a result, these valves are slow acting and do not function properly under certain conditions.

In my prior application Ser. No. 2,242, filed Jan. 10, 1979, a gravity operated valve is controlled by a plumb weight which is sufficiently sensitive for closing the valve with very little movement of the tank, e.g. through an angle of about thirty degrees. This apparatus has proved efficacious in many conditions for providing proper venting while preventing fuel spillage from the tank. However, in the case of larger engines where considerable venting of the tank is required, the velocity of airflow can interfere with proper operation of the vent valve. Therefore, it is desired to provide a fuel tank vent apparatus having a vent valve characterized by a positive action, particularly in the case of larger engines having greater airflow.

SUMMARY OF THE INVENTION

A fuel tank vent apparatus according to the present invention includes a vent body suitable for placement within an opening in a fuel tank, said vent body having a passageway extending therewithin from a vent inlet adapted to be located within the tank to a vent outlet adapted to be located externally of the tank. A valve located in this passageway has an operating member which may take the form of a push rod disposed longitudinally in the vent body, provided with biasing means urging this operating member in an upward direction for closing the valve. The upper part of the vent body forms an enclosure for receiving a weighted member, suitably in the form of a spherical metal ball, which bears downwardly on the aforementioned operating member and normally opens the valve when the vent body is in an upright position. When the vent body is disposed at an angle with respect to the vertical, the weight member does not exert as much force directly downwardly on the operating member and consequently spring bias is able to move the operating member and valve upwardly and close the passageway.

The enclosure for the weighted member is suitably ramp shaped or cone shaped for directing the ball primarily downwardly against the upper end of said operating member when the apparatus is in a vertical position. However, when the apparatus becomes tilted to a particular angle, the weight of the weighted member is borne to a lesser degree by the operating member and to a greater degree by the surrounding ramp or cone such that the spring bias is able to move the operating member in an upward direction. The positive action of the weighted member in a downward direction is able to maintain the proper opening and closing of the valve according to the orientation of the apparatus, despite relatively high velocity airflow through the venting passageway.

It is therefore an object of the present invention to provide an improved fuel tank vent apparatus having a sensitive gravity operated valve which is automatically closed when the fuel tank tips at greater than a predetermined angle to prevent leakage of liquid fuel through the vent passageway.

It is another object of the present invention to provide an improved tank vent apparatus of enhanced sensitivity which is also positive acting for maintaining its operation in the presence of relatively high vent flow velocities.

It is another object of the present invention to provide an improved positive acting fuel tank vent apparatus which is characterized by trouble-free operation and economical construction.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
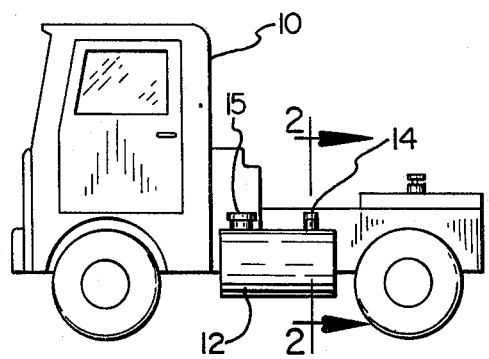
FIG. 1 is a side elevation view of a truck employing the fuel tank vent apparatus of the present invention.

As shown in FIG. 1, a truck 10 or other wheeled vehicle having a fuel tank 12 filled with liquid fuel such as gasoline, fuel oil, etc., is provided with the fuel tank vent apparatus 14 of the present invention. In addition, the fuel tank may also be provided with a separate fuel filler cap 15. However, the fuel vent apparatus can also serve as the fuel filler apparatus.

The fuel vent apparatus 14 according to the principal embodiment of the present invention is illustrated in greater detail in FIGS. 2 through 5 and includes a vent body 16 of metal such as aluminum, such body including an upper cylindrical portion 18 and a lower cylindrical portion 20 forming an extension which is coaxial with the upper portion. The upper portion is threadably attached to a vent tube 22 of the fuel tank by external threads 24 provided on the outer surface of the vent body upper portion, while the lower portion extends within the vent tube. For tanks with a smaller vent tube, a second set of threads 26 is formed on the outer surface of the lower portion 20. In any case, insertion of the vent body into a vent tube or the like is considered for all practical purposes the same as insertion within the fuel tank for venting of the tank.

Upper portion 18 of the vent body is provided with a cylindrical bore or cavity 28 communicating with a smaller, coaxial bore or cavity 30 in lower portion 20. A ball ramp member 32, having an outer diameter for mating reception within cavity 28, has a conical inner section 34 flaring outwardly and upwardly from cylindrical well 36, the latter slidably receiving push rod 38. The upper exterior of the cone terminates in downwardly extending legs 40 which have cylindrical outer surfaces positioned along the inner wall of cavity 28, said legs resting on the bottom end of the cavity 28, and defining cutouts 41 therebetween. A cylindrical retainer 42 is slidably received within cavity 28 above ramp member 32 and below vent cap 44 for holding ramp member 32 in place. Cap 44 has inwardly crimped locking projections 46 which extend under the upper rim of the vent body portion 18 for locking the cap in place. Below cap 44, the vent body is formed with a hexagonal turret or flange 48 by means of which the vent body can be threaded into vent tube 22.

Figure 2:
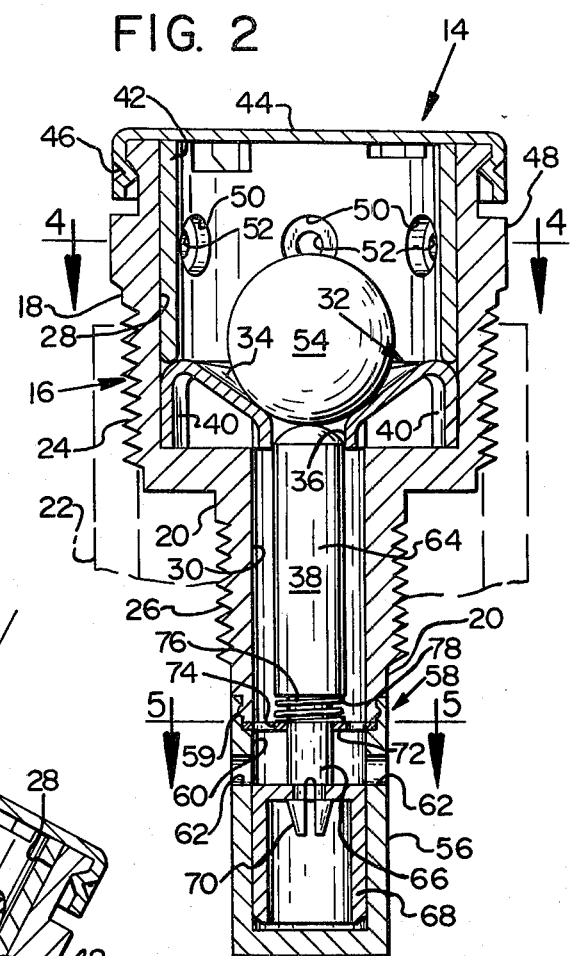
FIG. 2 is an enlarged vertical section of the vent apparatus according to the present invention, taken at 2—2 in FIG. 1 with the gravity valve open.

Retainer 42 includes a plurality of holes 50 around the circumference thereof which are aligned with somewhat smaller holes 52 in the vent body forming a vent outlet. Retainer 42 is keyed on slots (not shown) so the holes 50 and 52 will become properly aligned during assembly of the device. Ball ramp member 32 together with the retainer 42 as contained within cavity 28 form an enclosure or housing closed off by cap 44. This housing receives a weighted member in the form of a spherical metal ball 54 normally resting in the lower center of the ramp member 32, assuming the vent apparatus is in an upright position as depicted in FIG. 2. As can be seen, the enclosure or housing thus formed is larger than ball 54 allowing movement of the ball away from center position and up the incline provided by member 32, as when the vent body is tilted as in FIG. 3.

The lower extension of the vent body further includes a sleeve portion 56 joined to body portion 20 by means of a snap fitting 58 comprising a circumferential rib 59 of an inner axial end flange of body portion 20 mating with an internal groove on an outer axial end flange of sleeve portion 56. An apertured spacer disk 72 is located at the juncture between members 56 and 20, being locked between an inner shoulder of sleeve portion 56 and the inner axial flange of the body portion 20. Central bore 60 of sleeve portion 56 matches bore 30 of body portion 20 and just below the snap fitting the sleeve portion 56 has a plurality of circumferentially spaced ports or holes 62 which together form the inlet for the fuel tank vent apparatus. Bores 60 and 30 define an inner passageway together with the upper housing within cavity 28, said passageway extending between the vent inlet provided by ports 62 and the vent outlet provided by holes 50 and 52. It will be noted the cutouts 41 in ramp member 32 provide part of an airflow path from bore 30, under ramp member 32, where well 36 has a smaller outer diameter than the inner diameter of bore 30.

An operating member or push rod 38 is positioned longitudinally and coaxial of the vent body, and includes an upper part 64 slidable within well 36 in ramp member 32 as hereinbefore mentioned, the top of the push rod being rounded to engage the underside of ball 54. The lower part 66 of the push rod is smaller in diameter with the lower end thereof having a split tapered point 70 for snapping into an aperture in the top of otherwise hollow piston 68 slidable in bore 60 for selectively closing off ports 62. Tapered point 70 has an upper shoulder for securely fastening the piston in a slot defined between the tapered point and push rod portion 66 thereabove. The normal position of the piston as illustrated in FIG. 2 is immediately below the ports 62 for retaining a normal, vented condition for the fuel tank, as the ball 54 forces push rod 38 downwardly. However, the piston is capable of moving upwardly to close the ports as hereinafter described. The piston 68 forms a valve according to the present invention, with rod 38 providing the operating member therefor.

Figure 3:
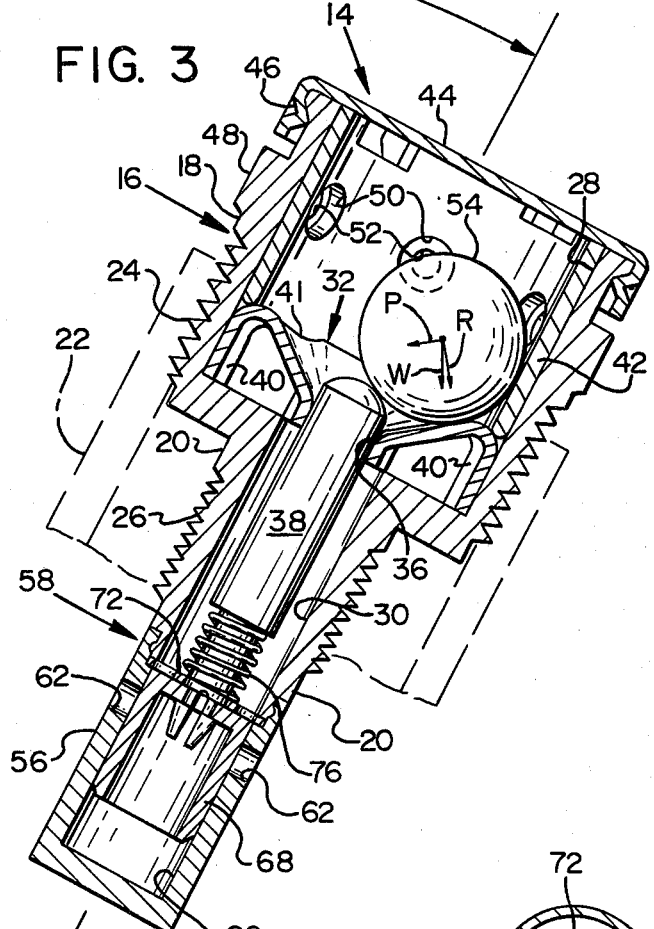
FIG. 3 is a vertical section similar to FIG. 2 but showing the vent apparatus tipped and the gravity valve closed.
Figure 4:
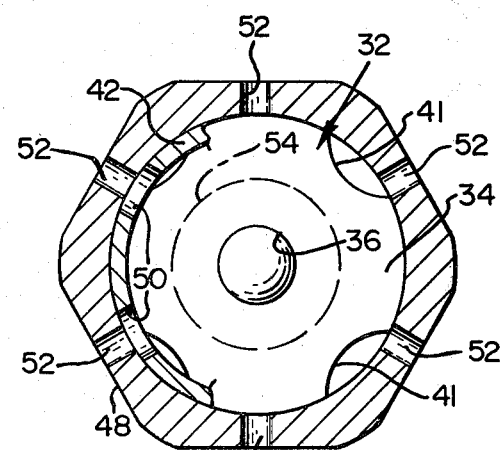
FIG. 4 is a horizontal cross-sectional view of the vent apparatus taken at 4—4 in FIG. 2 with the weighted member removed.
Figure 5:
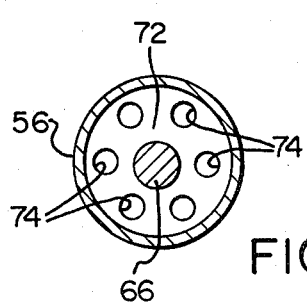
FIG. 5 is a horizontal cross section of a lower portion of the vent apparatus as taken at 5—5 in FIG. 2.

Spacer disk 72 has a central opening for slidably receiving push rod part 66 and also has a plurality of openings 74 therearound through which the central venting passageway of the device is completed. Spacer 72 supports balance spring 76 thereabove, the balance spring 76 being disposed coaxially around lower part 66 of the push rod and bearing upon lower shoulder 78 of upper part 64 of the push rod. The spring provides biasing means for urging the operating member or push rod upwardly against the weight of ball 54. For the position of the device illustrated in FIG. 2, where the ball 54 is centered by ramp member 32 and urges the push rod downwardly as shown, the shoulder 78 is positioned above spacer 72 by a sufficient distance for receiving spring 76 in its compressed condition. The force exerted by spring 76 is adjusted such that the weight of the ball 54 is able to compress the spring for the substantially upright orientation of the device, and in this orientation, the airflow passageway is completed through the ports 62 and the holes 50, 52 as mentioned. However, when the device becomes inclined at an angle A as illustrated in FIG. 3, the component of downward weight of the ball is borne to a lesser extent by the push rod and to a greater extent by ramp member 32. Thus, if the vertical force due to the weight of the ball 54 as illustrated at W in FIG. 3, and the same is resolved into a component R toward ramp member 32 and a perpendicular component P generally toward push rod 38, it will be seen that R is the much larger force. The upward force exerted by the spring in such that push rod 38 is then able to move upwardly against the smaller downward force component exerted thereagainst by the ball, and rod 38 carries with it piston 68 for closing ports 62. Piston 68 can move upwardly past ports 62 substantially until the top thereof meets spacer 72. Any further upward movement of the push rod into the housing containing ball 54 than is necessary for closing ports 62 is restrained. Consequently, fuel is prevented from escaping through the vent should the vehicle turn over or otherwise be inclined for example at angle A or greater. For the illustrated embodiment as constructed, the angle A is thirty degrees.

Then, when the vehicle is restored to its normal or substantially upward position, the ball 54 will again force the push rod 38 downwardly against the bias of spring 76 and reopen the ports 62. The enclosure or housing is larger than the ball to allow for latitude for the ball to move at least partially out of downward bearing relation with respect to rod 38.

For assembling the device according to the present invention, the balance spring 76 is inserted over the lower end of push rod 38 and also the spacer 72 is pushed over the end of rod 38. The piston 68 is snapped over tapered point 70. The piston 68 is slipped into sleever portion 56 and the sleeve portion is snapped onto the body portion 20. The ball ramp member 32 is inserted into the upper portion of the vent body around push rod 28, after which the retainer is also inserted into the vent body keying on slots (not shown) so that holes 50 and 52 line up. The ball 54 is inserted in the upper housing thereby provided, and the cap 44 is crimped in place.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A fuel tank vent apparatus, comprising:
   a vent body adapted to be secured within an opening in a liquid fuel tank and having a passageway extending therewithin from a vent inlet adapted to be located within said tank to a vent outlet adapted to be located externally of said tank,
   a valve located in said passageway for controlling the flow of fluid through said passageway, and an operating member for said valve, said operating member having an upper position for closing said valve and a lower position for opening said valve,
   biasing means for urging said operating member toward its upper position,
   and a weighted member bearing downwardly onto said operating member, when said vent body is in a substantially upright attitude, for holding the operating member downwardly against the bias of said biasing means,
   wherein said operating member comprises an operating rod extending longitudinally of said vent body, said weighted member normally engaging the upper end of said operating rod for urging the same downwardly against the bias of said biasing means,
   said vent body having an enclosure for receiving said weighted member in adjacent relation to said operating member, wherein said enclosure is larger than said weighted member for providing said weighted member latitude for movement at least partially out of downward bearing relation with respect to said operating member when said vent body becomes inclined so that said biasing means can move said operating member upwardly and close said valve, said weighted member returning to downwardly bearing relation with said operating member sufficiently to reopen said valve when said vent body is then uprighted,
   wherein said vent body includes a lower portion having said vent inlet communicating at a side thereof, said valve comprising a cylindrical piston slidably received in a cylindrical portion of said passgeway in said lower portion for closing off said vent inlet when said piston is in an upper position.

2. The fuel tank vent apparatus according to claim 1 wherein said weighted member comprises a ball, and said enclosure for locating said weighted member includes a ball ramp which directs said ball primarily downwardly against the upper end of said operating rod for a normal upright position of said vent body, while said ball bears against said ramp and at least to a lesser extent upon the end of said operating rod when said vent body becomes inclined from said upright position.

3. The fuel tank vent apparatus according to claim 2 wherein said ramp is substantially cone shaped, and flares outwardly in an upward direction for receiving said ball therewithin, said rod extending axially upwardly into said cone shaped ramp to engage the underside of said ball.

4. The fuel tank vent apparatus according to claim 1 wherein said piston is secured to the lower end of said operating rod.

5. The fuel tank apparatus according to claim 1 wherein said vent body is provided with threads for securing the same within an opening in a liquid fuel tank.

6. The fuel tank apparatus according to claim 1 wherein said lower portion is of smaller diameter than the upper portion of said vent body and wherein said lower portion is provided with threads for securing the same within an opening in a liquid fuel tank.

7. A fuel tank apparatus, comprising:
   a vent body adapted to be secured within an opening in a liquid fuel tank and having a passageway extending therewithin from a vent inlet adapted to be located within said tank to a vent outlet adapted to be located externally of said tank,
   a valve located in said passageway for controlling the flow of fluid through said passageway, and an operating member for said valve, said operating member having an upper position for closing said valve and a lower position for opening said valve,
   biasing means for urging said operating member toward its upper position,
   a weighted member bearing downwardly onto said operating member, when said vent body is in a substantially upright attitude, for holding the operating member downwardly against the bias of said biasing means,
   wherein said operating member comprises an operating rod extending longitudinally of said vent body, said weighted member normally engaging the upper end of said operating rod for urging the same downwardly against the bias of said biasing means, said biasing means comprising a spring disposed around said operating rod,
   said vent body having an enclosure for receiving said weighted member in adjacent relation to said operating member, wherein said enclosure is larger than said weighted member for providing said weighted member latitude for movement at least partially out of downward bearing relation with respect to said operating member when said vent body becomes inclined so that said biasing means can move said operating member upwardly and close said valve,
   wherein said vent body is provided with a lower extension including said vent inlet, said valve comprising a piston slidably received in a portion of said passageway for closing off said vent inlet when said piston is in an upper position, means for positioning said spring between said operating rod and said lower extension of said vent body.

8. The fuel tank vent apparatus according to claim 7 wherein said means for positioning said spring comprises a spacer extending across said passageway in said lower extension of said vent body above said piston, said spacer having a central opening for receiving said operating rod, and openings around said rod communicating with said passageway.

* * * * *

UNITED STATES PATENT AND TRADEMARK OFFICE
CERTIFICATE OF CORRECTION

PATENT NO. : 4,299,247

DATED : November 10, 1981

INVENTOR(S) : Russell D. Keller

It is certified that error appears in the above—identified patent and that said Letters Patent is hereby corrected as shown below:

Column 1, line 26, "a" between "such" and "cap" should have been deleted.

Column 1, lines 29 and 30, the word --of-- should have been after "tipping" and before "the".

Column 2, line 52, the word --view-- should have been after "section" and before "similar".

Column 3, line 56, "of", first occurrence, should have been --on--.

Column 4, line 56, "in" should have been --is--.

Column 5, line 13, "sleever" should have been --sleeve--.

Claim 7, column 7, line 1, the word --and-- should have been before "means".

Signed and Sealed this

Twenty-eighth Day of June 1983

[SEAL]

Attest:

Attesting Officer

GERALD J. MOSSINGHOFF

Commissioner of Patents and Trademarks